United States Patent
Gong et al.

(10) Patent No.: US 12,088,113 B2
(45) Date of Patent: Sep. 10, 2024

(54) ISOLATED POWER SUPPLY CIRCUIT AND CONTROL METHOD THEREOF

(71) Applicant: SUZHOU NOVOSENSE MICROELECTRONICS CO., LTD., Suzhou (CN)

(72) Inventors: Xiaohan Gong, Suzhou (CN); Yun Sheng, Suzhou (CN)

(73) Assignee: SUZHOU NOVOSENSE MICROELECTRONICS CO., LTD., Suzhou (CN)

( * ) Notice: Subject to any disclaimer, the term of this patent is extended or adjusted under 35 U.S.C. 154(b) by 312 days.

(21) Appl. No.: 17/438,384

(22) PCT Filed: Jul. 26, 2019

(86) PCT No.: PCT/CN2019/097956
§ 371 (c)(1),
(2) Date: Sep. 10, 2021

(87) PCT Pub. No.: WO2021/000365
PCT Pub. Date: Jan. 7, 2021

(65) Prior Publication Data
US 2022/0224158 A1    Jul. 14, 2022

(30) Foreign Application Priority Data

Jul. 1, 2019    (CN) .......................... 201910583489.2

(51) Int. Cl.
*H02J 50/12*    (2016.01)
*H02J 50/10*    (2016.01)

(52) U.S. Cl.
CPC .............. *H02J 50/12* (2016.02); *H02J 50/10* (2016.02)

(58) Field of Classification Search
CPC .......... H02J 50/12; H02J 50/10; H02M 1/088; H02M 1/32; H02M 1/096
See application file for complete search history.

(56) References Cited

U.S. PATENT DOCUMENTS

2002/0070815 A1* 6/2002 Traub ..................... H03J 5/244
                                                        331/117 R
2004/0222860 A1   11/2004 Van Zeijl et al.
2012/0025921 A1    2/2012 Yang et al.

FOREIGN PATENT DOCUMENTS

CN        103001584 A      3/2013
CN        103595260 A      2/2014
(Continued)

*Primary Examiner* — Jung Kim
(74) *Attorney, Agent, or Firm* — Cheng-Ju Chiang

(57) ABSTRACT

The present invention provides an isolated power supply circuit, which includes: a transmitting unit and a receiving unit. The transmitting unit is connected with a voltage source and includes a resonant circuit and a gate voltage division circuit. The gate voltage division circuit includes: a first voltage division branch, wherein one terminal of the first voltage division branch is connected between a first inductor and an input terminal of a first MOS transistor; and a second voltage division branch, wherein one terminal of the second voltage division branch is connected between a second inductor and an input terminal of a second MOS transistor. Therefore, voltages at gates of the first MOS transistor and the second MOS transistor can be changed by regulating voltage division conditions of the first voltage division branch and the second voltage division branch.

5 Claims, 3 Drawing Sheets

(56) References Cited

FOREIGN PATENT DOCUMENTS

| CN | 106549636 A | 3/2017 |
| CN | 107248847 A | 10/2017 |
| CN | 111181363 A | 5/2020 |

* cited by examiner

ISOLATED POWER SUPPLY CIRCUIT AND CONTROL METHOD THEREOF

This application is a 35 U.S.C. § 371 National Phase conversion of International (PCT) Patent Application No. PCT/CN2019/097956, filed on Jul. 26, 2019, which claims priority to Chinese Patent Application No. 201910583489.2, filed on Jul. 1, 2019 and entitled "ISOLATED POWER SUPPLY CIRCUIT AND CONTROL METHOD THEREOF", which is incorporated herein by reference in its entirety. The PCT International Patent Application was filed and published in Chinese.

TECHNICAL FIELD

The present invention relates to the field of isolated power supply chips, and more particularly, to a gate voltage—regulable isolated power supply circuit and a control method thereof.

BACKGROUND

As shown in FIG. 1, an existing isolated power supply usually includes a primary-side transmitting unit 10 and a secondary-side receiving unit 20. The primary-side transmitting unit 10 is connected with a voltage source $V_{dd}$ and includes inductors $L_{p1}$ and $L_{p2}$ at a transformer primary side. The inductors $L_{p1}$ and $L_{p2}$ at the transformer primary sides $L_{p1}$ and $L_{p2}$ and a capacitor form a resonant network for transferring energy of the voltage source $V_{dd}$ to inductors $L_{S1}$ and $L_{S2}$ at a transformer secondary side. The secondary-side receiving unit 20 rectifies a transformed alternating current to a direct current through a rectifier 21, and outputs the direct current.

As shown in FIG. 1, two power MOS transistors M1 and M2 are usually adopted in the prior art to control an LC resonant network. However, when the LC resonant network starts resonance, voltages at drains of M1 and M2 may be as high as three times of that of a power supply, and voltages at gates of M1 and M2 may also reach three times of that of the power supply. Therefore, production of the gates of M1 and M2 usually require a special process, which increases the cost.

Therefore, it's necessary to design an isolated power supply circuit capable of regulating voltages at gates of MOS transistors and a control method thereof.

SUMMARY

To solve one of the above problems, the present invention provides an isolated power supply circuit, including: a transmitting unit and a receiving unit. The transmitting unit is connected with a voltage source and includes a resonant circuit configured to transfer energy of the voltage source from the transmitting unit to the receiving unit, and a gate voltage division circuit. The resonant circuit includes: a first LC resonant branch, including: a first inductor, a first capacitor, and a first MOS transistor, wherein the first inductor and the first capacitor are connected in series between the voltage source and the ground, an input terminal of the first MOS transistor is connected between the first inductor and the first capacitor, and an output terminal of the first MOS transistor is grounded; and a second LC resonant branch, including: a second inductor, a second capacitor, and a second MOS transistor, wherein the second inductor and the second capacitor are connected in series between the voltage source and the ground, an input terminal of the second MOS transistor is connected between the second inductor and the second capacitor, and an output terminal of the second MOS transistor is grounded. The gate voltage division circuit includes: a first voltage division branch, wherein one terminal of the first voltage division branch is grounded, the other terminal thereof is connected between the first inductor and the input terminal of the first MOS transistor, the first voltage division branch includes a first voltage division part and a second voltage division part that are connected in series, and a gate of the second MOS transistor is connected between the first voltage division part and the second voltage division part; and a second voltage division branch, wherein one terminal of the second voltage division branch is grounded, the other terminal thereof is connected between the second inductor and the input terminal of the second MOS transistor, the second voltage division branch includes a third voltage division part and a fourth voltage division part that are connected in series, and a gate of the first MOS transistor is connected to a joint between the third voltage division part and the fourth voltage division part.

As a further improvement of the present invention, the isolated power supply circuit further includes a gate regulating branch, wherein the gate regulating branch includes a peak voltage detector and a capacitance controller that are connected with each other; the peak voltage detector is connected with gates of the first MOS transistor and the second MOS transistor respectively, to detect voltage peaks $V_p$ at the gates; and the capacitance controller is connected with the fourth voltage division part and the second voltage division part respectively, to change resistances of the fourth voltage division part and the second voltage division part.

As a further improvement of the present invention, all of the first voltage division part, the second voltage division part, the third voltage division part, and the fourth voltage division part are voltage division capacitors.

As a further improvement of the present invention, the first capacitor and the second capacitor are adjustable capacitors for changing a resonant frequency.

As a further improvement of the present invention, the isolated power supply circuit further includes a feedback branch, an isolator and a drive that are connected between the transmitting unit and the receiving unit, wherein the drive is connected between gates of the first MOS transistor and the second MOS transistor, to control on-off of the first MOS transistor and the second MOS transistor.

To solve one of the above problems, the present invention provides a control method of an isolated power supply circuit. The control method includes: detecting a voltage peak $V_p$ at a gate of a first MOS transistor or a second MOS transistor; comparing the voltage peak $V_p$ at the gate of the first MOS transistor or the second MOS transistor with a maximum threshold $V_{th-h}$ and a minimum threshold $V_{th-l}$; and when $V_p > V_{th-h}$, decreasing a resistance of a fourth voltage division part or a second voltage division part; or when $V_p < V_{th-l}$, increasing the resistance of the fourth voltage division part or the second voltage division part.

As a further improvement of the present invention, said "decreasing a resistance of a fourth voltage division part or a second voltage division part" is performed specifically by: increasing a capacitance of the fourth voltage division part or the second voltage division part; and said "increasing the capacitance of the fourth voltage division part or the second voltage division part" is performed specifically by: decreasing the capacitance of the fourth voltage division part or the second voltage division part.

As a further improvement of the present invention, said "detecting a voltage peak $V_p$ at a gate of a first MOS transistor or a second MOS transistor" includes: detecting and acquiring a real-time voltage waveform $V_g$ at the gate of the first MOS transistor or the second MOS transistor; performing calculation based on the real-time voltage waveform $V_g$ and acquiring a voltage peak waveform $V_f$; and extracting a corresponding voltage peak $V_p$ from the voltage peak waveform $V_f$ after an interval of several periods of the real-time voltage waveform $V_g$ when it is in a falling state.

As a further improvement of the present invention, said "extracting a corresponding voltage peak $V_p$ from the voltage peak waveform $V_f$ after an interval of several periods of the real-time voltage waveform $V_g$ when it is in a falling state" specifically includes: extracting the corresponding voltage peaks $V_p$ from the voltage peak waveform $V_f$ after an interval of several periods of the real-time voltage waveform $V_g$ when it is in a falling state.

Compared with the prior art, the gates of the first MOS transistor M1 and the second MOS transistor M2 in the present invention are respectively connected with the first voltage division branch and the second voltage division branch. Therefore, voltages at the gates of the first MOS transistor M1 and the second MOS transistor M2 can be regulated based on voltage division conditions of the first voltage division branch and the second voltage division branch, thereby preventing the voltages at the gates of the first MOS transistor M1 and the second MOS transistor M2 from being too high or too low.

DETAILED DESCRIPTION

To make a person skilled in the art understand the technical solutions in the present invention better, the following describes the technical solutions in embodiments of the present invention clearly and completely with reference to accompanying drawings for embodiments of the present invention. Apparently, the described embodiments are merely some but not all of embodiments of the present invention. All other embodiments acquired by a person of ordinary skill in the art based on embodiments of the present invention without creative efforts shall fall within the protection scope of the present invention.

Figure 1:
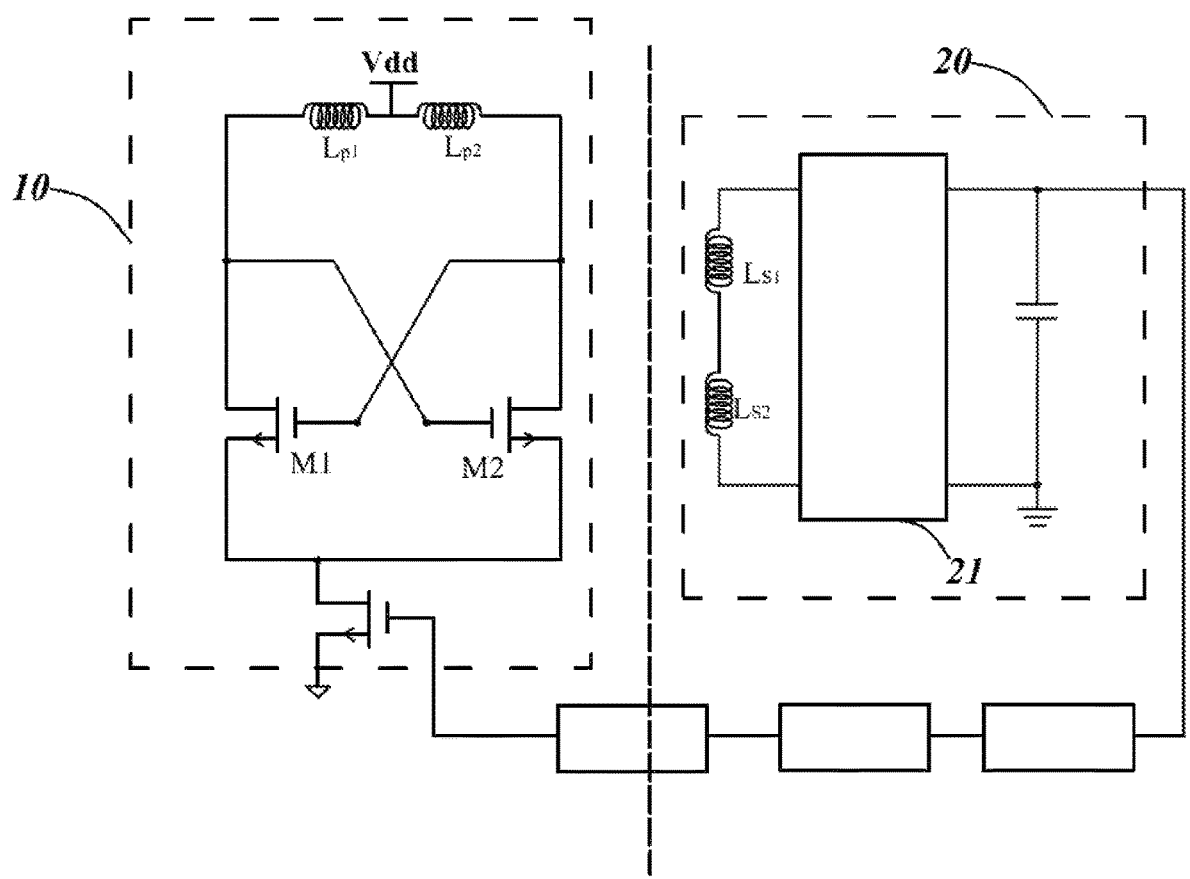
FIG. 1 is a circuit diagram of an isolated power supply circuit according to the prior art.
Figure 2:
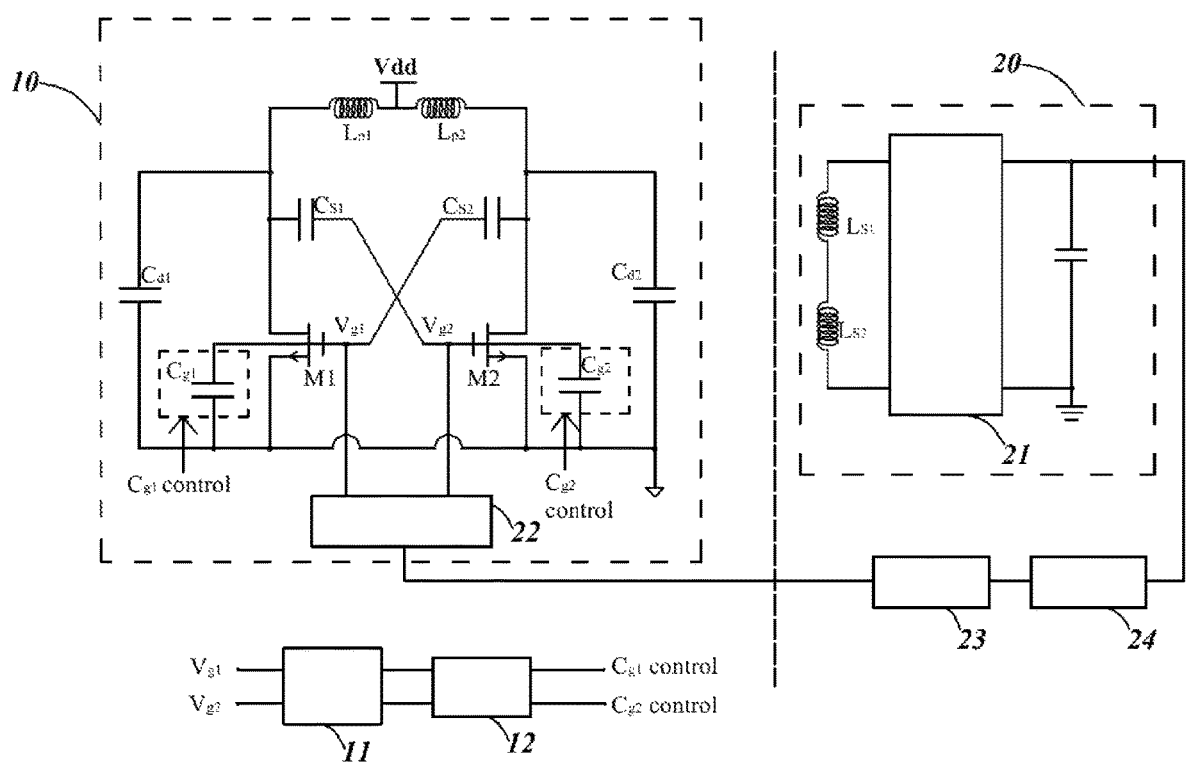
FIG. 2 is a circuit diagram of an isolated power supply according to the present invention.
Figure 3:
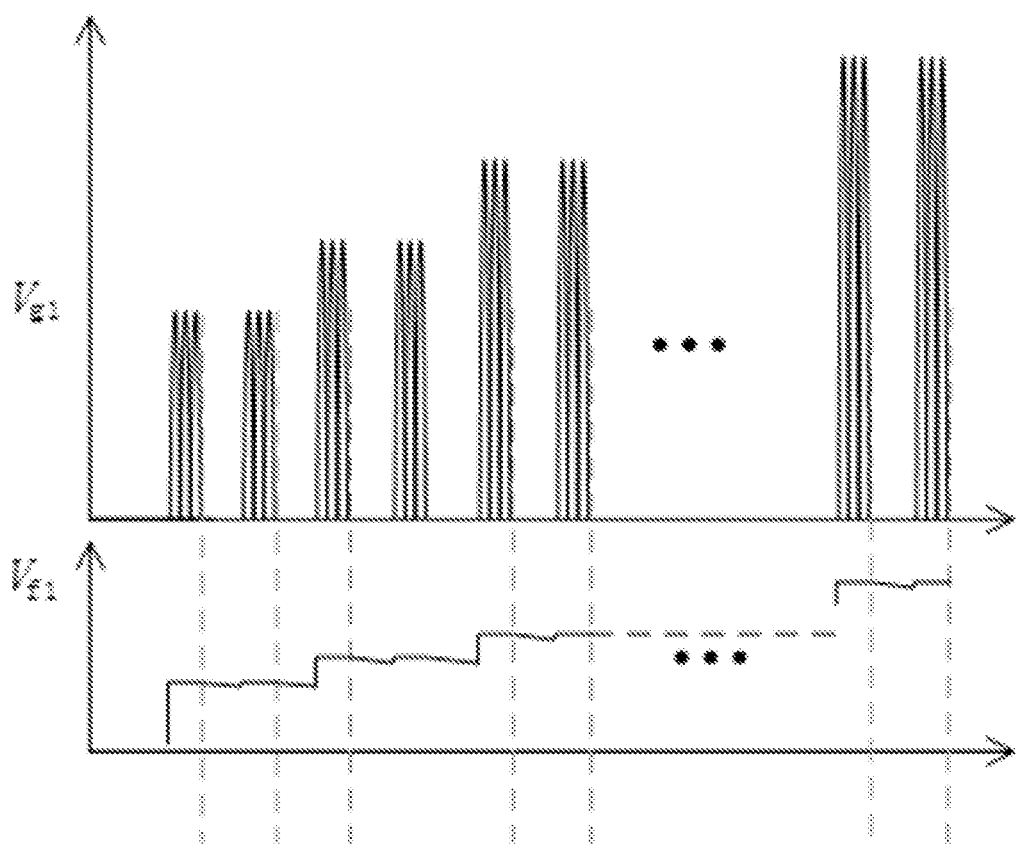
FIG. 3 is waveform diagrams acquired before and after using a peak voltage detector according to an embodiment of the present invention.

As shown in FIG. 2 and FIG. 3, the present invention provides an isolated power supply circuit. The isolated power supply circuit includes: a transmitting unit 10 and a receiving unit 20. The transmitting unit 10 forms a resonant network based on the principle of LC resonance, to transfer energy of a voltage source $V_{dd}$ to the receiving unit 20. The receiving unit 20 is provided with inductors $L_{s1}/L_{s2}$ at a transformer secondary side, to receive the energy. The receiving unit 20 is further provided with a rectifier 21. The rectifier 21 converts the energy to a DC voltage and outputs the latter.

Specifically, the transmitting unit 10 includes a resonant circuit configured to transfer energy of the voltage source $V_{dd}$ from the transmitting unit 10 to the receiving unit 20, and a gate voltage division circuit. The resonant circuit is connected with the voltage source $V_{dd}$.

The resonant circuit includes:

a first LC resonant branch, including: a first inductor $L_{p1}$, a first capacitor $C_{d1}$, and a first MOS transistor M1, wherein the first inductor $L_{p1}$ and the first capacitor $C_{d1}$ are connected in series between the voltage source $V_{dd}$ and the ground, an input terminal of the first MOS transistor M1 is connected between the first inductor $L_{p1}$ and the first capacitor $C_{d1}$, and the output terminal of the first MOS transistor M1 is grounded; and a second LC resonant branch, including: a second inductor $L_{p2}$, a second capacitor $C_{d2}$, and a second MOS transistor M2, wherein the second inductor $L_{p2}$ and the second capacitor $C_{d2}$ are connected in series between the voltage source $V_{dd}$ and the ground, an input terminal of the second MOS transistor M2 is connected between the second inductor $L_{p2}$ and the second capacitor $C_{d2}$, and the output terminal of the second MOS transistor M2 is grounded.

In this embodiment, both the input terminals of the first MOS transistor M1 and the second MOS transistor M2 are drains, and both the output terminals thereof are sources. Alternatively, if the input terminals of the first MOS transistor M1 and the second MOS transistor M2 are sources, and the output terminals thereof are drains, the objective of the present invention can also be achieved. On-off of the first MOS transistor M1 and the second MOS transistor M2 can be controlled, thereby controlling on-off and a resonant state of the resonant circuit.

The gate voltage division circuit includes:

a first voltage division branch, wherein one terminal of the first voltage division branch is grounded, the other terminal thereof is connected between the first inductor $L_{p1}$ and the input terminal of the first MOS transistor M1, the first voltage division branch includes a first voltage division part $C_{S1}$ and a second voltage division part $C_{g2}$ that are connected in series, and a gate of the second MOS transistor M2 is connected between the first voltage division part $C_{S1}$ and the second voltage division part $C_{g2}$; and a second voltage division branch, where one terminal of the second voltage division branch is grounded, the other terminal thereof is connected between the second inductor $L_{p2}$ and the input terminal of the second MOS transistor M2, the second voltage division branch includes a third voltage division part $C_{S2}$ and a fourth voltage division part $C_{g1}$ that are connected in series, and a gate of the first MOS transistor M1 is connected to a joint between the third voltage division part $C_{S2}$ and the fourth voltage division part $C_{g1}$.

Therefore, in the present invention, the gates of the first MOS transistor M1 and the second MOS transistor M2 are respectively connected with the first voltage division branch and the second voltage division branch. Therefore, voltages at the gates of the first MOS transistor M1 and the second MOS transistor M2 can be regulated based on voltage division conditions of the first voltage division branch and the second voltage division branch, and be prevented from being too high or too low. The voltage at the gate of the second MOS transistor M2 can be changed by adjusting a ratio between the first voltage division part $C_{S1}$ and the second voltage division part $C_{g2}$ in the first voltage division branch. Similarly, the voltage at the gate of the first MOS transistor M1 can be changed by adjusting a ratio between the third voltage division part $C_{S2}$ and the fourth voltage division part $C_{g1}$ in the second voltage division branch. In this way, the voltages at the gates of the first MOS transistor M1 and the second MOS transistor M2 are in a proper range, thereby being prevented from being so high as to affect the service lives of the first MOS transistor M1 and the second MOS transistor M2, or being so low as to affect output efficiency of the isolated power supply circuit.

Specifically, when the voltage at the gate of the first MOS transistor M1 or the second MOS transistor M2 is too high, the resistance of the fourth voltage division part $C_{g1}$ or the second voltage division part $C_{g2}$ is decreased accordingly. When the voltage at the gate of the first MOS transistor M1 or the second MOS transistor M2 is too low, the resistance of the fourth voltage division part $C_{g1}$ or the second voltage division part $C_{g2}$ is increased accordingly. Alternatively, the first voltage division part $C_{S1}$ and the third voltage division part $C_{S2}$ are adjusted. For example, when the voltage at the gate of the first MOS transistor M1 or the second MOS transistor M2 is too high, the resistance of the first voltage division part $C_{S1}$ or the third voltage division part $C_{S2}$ is increased accordingly. When the voltage at the gate of the first MOS transistor M1 or the second MOS transistor M2 is too low, the resistance of the first voltage division part $C_{S1}$ or the third voltage division part $C_{S2}$ is decreased accordingly.

Further, the voltages at the gates of the first MOS transistor M1 and the second MOS transistor M2 in the present invention can be regulated in a self-adapting manner. Specifically, the isolated power supply circuit further includes a gate regulating branch. The gate regulating branch includes a peak voltage detector 11 and a capacitance controller 12 that are connected with each other. The peak voltage detector 11 is connected to the gates of the first MOS transistor M1 and the second MOS transistor M2 respectively, to detect voltage peaks $V_p$ at the gates. The capacitance controller 12 is connected with the fourth voltage division part $C_{g1}$ and second voltage division part $C_{g2}$ respectively, to change the resistances of the fourth voltage division part $C_{g1}$ and the second voltage division part $C_{g2}$.

Therefore, in this embodiment, the peak voltage detector 11 can be configured to detect the voltage peaks $V_p$ at the gates of the first MOS transistor M1 and the second MOS transistor M2, thereby performing self-adapting regulation on the resistances of the fourth voltage division part $C_{g1}$ and the second voltage division part $C_{g2}$ based on gate voltage fluctuation of the first MOS transistor M1 and the second MOS transistor M2, instead of manual measurement and adjustment.

Specifically, when the peak voltage detector 11 detects that the voltage peak $V_p$ at the gate of the first MOS transistor M1 or the second MOS transistor M2 is greater than a maximum threshold $V_{th-h}$, the capacitance controller 12 decreases the resistance of the fourth voltage division part $C_{g1}$ or the second voltage division part $C_{g2}$.

When the peak voltage detector 11 detects that the voltage peak $V_p$ at the gate of the first MOS transistor M1 or the second MOS transistor M2 is less than a minimum threshold $V_{th-1}$, the capacitance controller 12 increases the resistance of the fourth voltage division part $C_{g1}$ or the second voltage division part $C_{g2}$.

Therefore, through automatic detection and adjustment, the resistance of the fourth voltage division part $C_{g1}$ or the second voltage division part $C_{g2}$ can be kept in a proper range. Further, the voltages at the gates of the first MOS transistor M1 and the second MOS transistor M2 are kept between $V_{th-1}$ and $V_{th-h}$, thereby being prevented from being too high or too low.

In addition, in this embodiment, all of the first voltage division part $C_{S1}$, the second voltage division part $C_{g2}$, the third voltage division part $C_{S2}$, and the fourth voltage division part $C_{g1}$ may be voltage division capacitors. A resistance of a capacitor satisfies the following formula:

$$R_c = \frac{1}{\omega C}.$$

Therefore, in this embodiment, when the peak voltage detector 11 detects that the voltage peak $V_p$ at the gate of the first MOS transistor M1 or the second MOS transistor M2 is greater than the maximum threshold $V_{th-h}$, the capacitance controller 12 increases the capacitance of the fourth voltage division part $C_{g1}$ or the second voltage division part $C_{g2}$; and when the peak voltage detector 11 detects that the voltage peak $V_p$ at the gate of the first MOS transistor M1 or the second MOS transistor M2 is less than the minimum threshold $V_{th-1}$, the capacitance controller 12 decreases the capacitance of the fourth voltage division part $C_{g1}$ or the second voltage division part $C_{g2}$.

Therefore, in this embodiment, the resistance of the fourth voltage division part $C_{g1}$ or the second voltage division part $C_{g2}$ is adjusted by regulating the capacitance of the fourth voltage division part $C_{g1}$ or the second voltage division part $C_{g2}$, to further adjust the voltage at the gate of the first MOS transistor M1 or the second MOS transistor M2, and regulate the voltages at the gates of the first MOS transistor M1 and the second MOS transistor M2 to a proper voltage range. In addition, the foregoing gate voltages can be regulated respectively, to solve a problem that processes of the first inductor $L_{p1}$, the second inductor $L_{p2}$, the first capacitor $C_{d1}$, the second capacitor $C_{d2}$, the first MOS transistor M1, and the second MOS transistor M2 are not matched.

Similarly, the first capacitor $C_{d1}$ and the second capacitor $C_{d2}$ are also adjustable capacitors, thereby decreasing a resonant frequency f.

Specifically, the resonant frequency satisfies the following formula:

$$f = \frac{1}{2\pi\sqrt{LC}}.$$

Therefore, for increasing the resonant frequency of the first LC resonant branch or the second LC resonant branch, the capacitance of the first capacitor $C_{d1}$ or the second capacitor $C_{d2}$ is decreased; for decreasing the resonant frequency of the first LC resonant branch or the second LC resonant branch, the capacitance of the first capacitor $C_{d1}$ or the second capacitor $C_{d2}$ is increased.

In addition, the isolated power supply circuit further includes a feedback branch 24, an isolator 23 and a drive 22 that are connected between the transmitting unit 10 and the receiving unit 20. The drive 22 is connected between the gates of the first MOS transistor M1 and the second MOS transistor M2, to control on-off of the first MOS transistor M1 and the second MOS transistor M2. Specifically, when the drive 22 outputs a high level, it forces levels at gates of the first MOS transistor M1 and the second MOS transistor M2 to be low levels. As a result, the first MOS transistor M1 and the second MOS transistor M2 are turned off, and the resonant circuit is shut off. When the drive 22 outputs a high resistance state, on-off of the first MOS transistor M1 and the second MOS transistor M2 depends on the resonant circuit. In addition, before resonance is started, the drive 22 outputs a "start" waveform for assisting the resonant circuit to start the resonance.

The present invention further provides a control method of an isolated power supply circuit. Specifically, the control method includes:

detecting a voltage peak $V_p$ at the gate of a first MOS transistor M1 or the second MOS transistor M2;

comparing the voltage peak $V_p$ at the gate of the first MOS transistor M1 or the second MOS transistor M2 with the maximum threshold $V_{th-h}$ and the minimum threshold $V_{th-1}$; and when $V_p > V_{th-h}$, decreasing the resistance of the fourth voltage division part $C_{g1}$ or the second voltage division part $C_{g2}$; or when $V_p < V_{th-1}$, increasing the resistance of the fourth voltage division part $C_{g1}$ or the second voltage division part $C_{g2}$.

In the foregoing control method, the resistance of the fourth voltage division part $C_{g1}$ or the second voltage division part $C_{g2}$ is adjusted by detecting the voltage peaks $V_p$ at the gates of the first MOS transistor M1 and the second MOS transistor M2. As mentioned above, all of the first voltage division part $C_{S1}$, the second voltage division part $C_{g2}$, the third voltage division part $C_{S2}$, and the fourth voltage division part $C_{g1}$ in the present invention may be voltage division capacitors, therefore, said "decreasing the resistance of the fourth voltage division part $C_{g1}$ or the second voltage division part $C_{g2}$" may be performed specifically by: increasing the capacitance of the fourth voltage division part $C_{g1}$ or the second voltage division part $C_{g2}$; and said "increasing the resistance of the fourth voltage division part $C_{g1}$ or the second voltage division part $C_{g2}$" may be performed specifically by: decreasing the capacitance of the fourth voltage division part $C_{g1}$ or the second voltage division part $C_{g2}$.

In addition, in this embodiment, because the voltage source $V_{dd}$ is an AC voltage source, an alternating current is generated in the resonance process. Specifically, waveforms at gates of the first MOS transistor M1 and the second MOS transistor M2 are similar to sinusoidal waves. Therefore, to facilitate the comparison with the maximum threshold $V_{th-h}$ and the minimum threshold $V_{th-1}$, the peak voltage detector 11 needs to adjust the voltage waveforms of the first MOS transistor M1 and the second MOS transistor M2. Therefore, said "detecting a voltage peak $V_p$ at a gate of a first MOS transistor M1 or a second MOS transistor M2" includes:

detecting and acquiring a real-time voltage waveform $V_g$ at the gate of the first MOS transistor M1 or the second MOS transistor M2;

performing calculation based on the real-time voltage waveform $V_g$ and acquiring a voltage peak waveform $V_f$; and extracting a corresponding voltage peak $V_p$ from the voltage peak waveform $V_f$ after an interval of several periods of the real-time voltage waveform $V_g$ when it is in a falling state.

Specifically, for example, as shown in FIG. 3, the real-time voltage waveform at the gate of the first MOS transistor M1 is $V_{g1}$. After acquiring and adjusting the real-time voltage waveform $V_{g1}$, the peak voltage detector 11 outputs a voltage peak waveform $V_{f1}$, to facilitate sampling and comparing with the maximum threshold $V_{th-h}$ and the minimum threshold $V_{th-1}$. Then, the capacitance controller 12 outputs a signal based on the comparison result to adjust the capacitance of the fourth voltage division part $C_{g1}$.

In addition, in this embodiment, as described above, the real-time voltage waveform $V_g$ is similar to a sinusoidal wave. Therefore, said "extracting a corresponding voltage peak $V_p$ from the voltage peak waveform $V_f$ after an interval of several periods of the real-time voltage waveform $V_g$ when it is in a falling state", that is, comparing the voltage peak $V_p$ with the maximum threshold $V_{th-h}$ and the minimum threshold $V_{th-1}$ in this embodiment, is performed not in real time. Instead, a proper sampling time point is selected after an interval of several periods in the real-time voltage waveform $V_g$, thereby avoiding noise interference.

In addition, it can be seen from FIG. 3 that for a falling portion of the waveform of the real-time voltage waveform $V_{g1}$, a corresponding portion in the voltage peak waveform $V_{f1}$ also fall slightly. Therefore, to improve the reliability of the comparison, said "extracting a corresponding voltage peak $V_p$ from the voltage peak waveform $V_f$ after an interval of several periods of the real-time voltage waveform $V_g$ when it is in a falling state" may specifically include:

extracting the corresponding voltage peaks $V_p$ from the voltage peak waveform after an interval of several periods of the real-time voltage waveform $V_g$ when it is in a falling state, thereby improving accuracy of the voltage peak $V_p$ and decreasing comparison errors.

Therefore, in conclusion, the voltages at the gates of the first MOS transistor M1 and the second MOS transistor M2 can be adjusted by the first voltage division branch and the second voltage division branch provided in the present invention, thereby keeping the gate voltages in a proper range, avoiding a too high gate voltage which may affect the service lives of the first MOS transistor M1 and the second MOS transistor M2, and avoiding a too low gate voltage which may affect the efficiency of the resonant circuit. In addition, due to a voltage detection branch and the capacitance controller 12, voltage division conditions of the first voltage division branch and the second voltage division branch can be regulated in a self-adapting manner by detecting the voltages at the gates of the first MOS transistor M1 and the second MOS transistor M2, thereby further controlling the voltages at the gates of the first MOS transistor M1 and the second MOS transistor M2 in a proper range. Therefore, manual adjusting is not required, which is more convenient for use.

In addition, it should be understood that, although this specification is described according to the embodiments, not every embodiment contains only one independent technical solution. The narration mode of this specification is used only for clarity. Persons skilled in the art shall take this specification as a whole. The technical solutions in the embodiments can also be properly combined to form other embodiments that can be understood by persons skilled in the art.

The series of detailed descriptions listed above are only for specific description of feasible implementation of the present invention, and are not intended to limit the protection scope of the present invention. Any equivalent implementation or alternation that is within the craftsmanship spirit of the present invention shall be included in the protection scope of the present invention.

What is claimed is:

1. An isolated power supply circuit, comprising:
a transmitting unit and a receiving unit, wherein the transmitting unit is connected with a voltage source and comprises a resonant circuit configured to transfer energy of the voltage source from the transmitting unit to the receiving unit, and a gate voltage division circuit;

the resonant circuit comprises:
- a first LC resonant branch, comprising: a first inductor, a first capacitor, and a first MOS transistor, wherein the first inductor and the first capacitor are connected in series between the voltage source and the ground; and an input terminal of the first MOS transistor is connected between the first inductor and the first capacitor, and an output terminal of the first MOS transistor is grounded; and
- a second LC resonant branch, comprising: a second inductor, a second capacitor, and a second MOS transistor, wherein the second inductor and the second capacitor are connected in series between the voltage source and the ground; and an input terminal of the second MOS transistor is connected between the second inductor and the second capacitor, and an output terminal of the second MOS transistor is grounded; and the gate voltage division circuit comprises:
- a first voltage division branch, wherein one terminal of the first voltage division branch is grounded, and the other terminal thereof is connected between the first inductor and the input terminal of the first MOS transistor; the first voltage division branch comprises a first voltage division part and a second voltage division part that are connected in series; and a gate of the second MOS transistor is connected between the first voltage division part and the second voltage division part; and
- a second voltage division branch, wherein one terminal of the second voltage division branch is grounded, and the other terminal thereof is connected between the second inductor and the input terminal of the second MOS transistor; the second voltage division branch comprises a third voltage division part and a fourth voltage division part that are connected in series; and a gate of the first MOS transistor is connected to a joint between the third voltage division part and the fourth voltage division part.

2. The isolated power supply circuit according to claim 1, wherein the isolated power supply circuit further comprises a gate regulating branch; the gate regulating branch comprises a peak voltage detector and a capacitance controller that are connected with each other; the peak voltage detector is connected with gates of the first MOS transistor and the second MOS transistor respectively, to detect voltage peaks $V_p$ at the gates; and the capacitance controller is connected with the fourth voltage division part and the second voltage division part respectively, to change resistances of the fourth voltage division part and the second voltage division part.

3. The isolated power supply circuit according to claim 1, wherein all of the first voltage division part, the second voltage division part, the third voltage division part, and the fourth voltage division part are voltage division capacitors.

4. The isolated power supply circuit according to claim 1, wherein the first capacitor and the second capacitor are adjustable capacitors for changing a resonant frequency.

5. The isolated power supply circuit according to claim 1, wherein the isolated power supply circuit further comprises a feedback branch, an isolator and a drive that are connected between the transmitting unit and the receiving unit, wherein the drive is connected between gates of the first MOS transistor and the second MOS transistor, to control on-off of the first MOS transistor and the second MOS transistor.

\* \* \* \* \*